Feb. 8, 1927. 1,616,583
L. E. LA BRIE
BRAKE SHOE
Filed Sept. 20, 1926
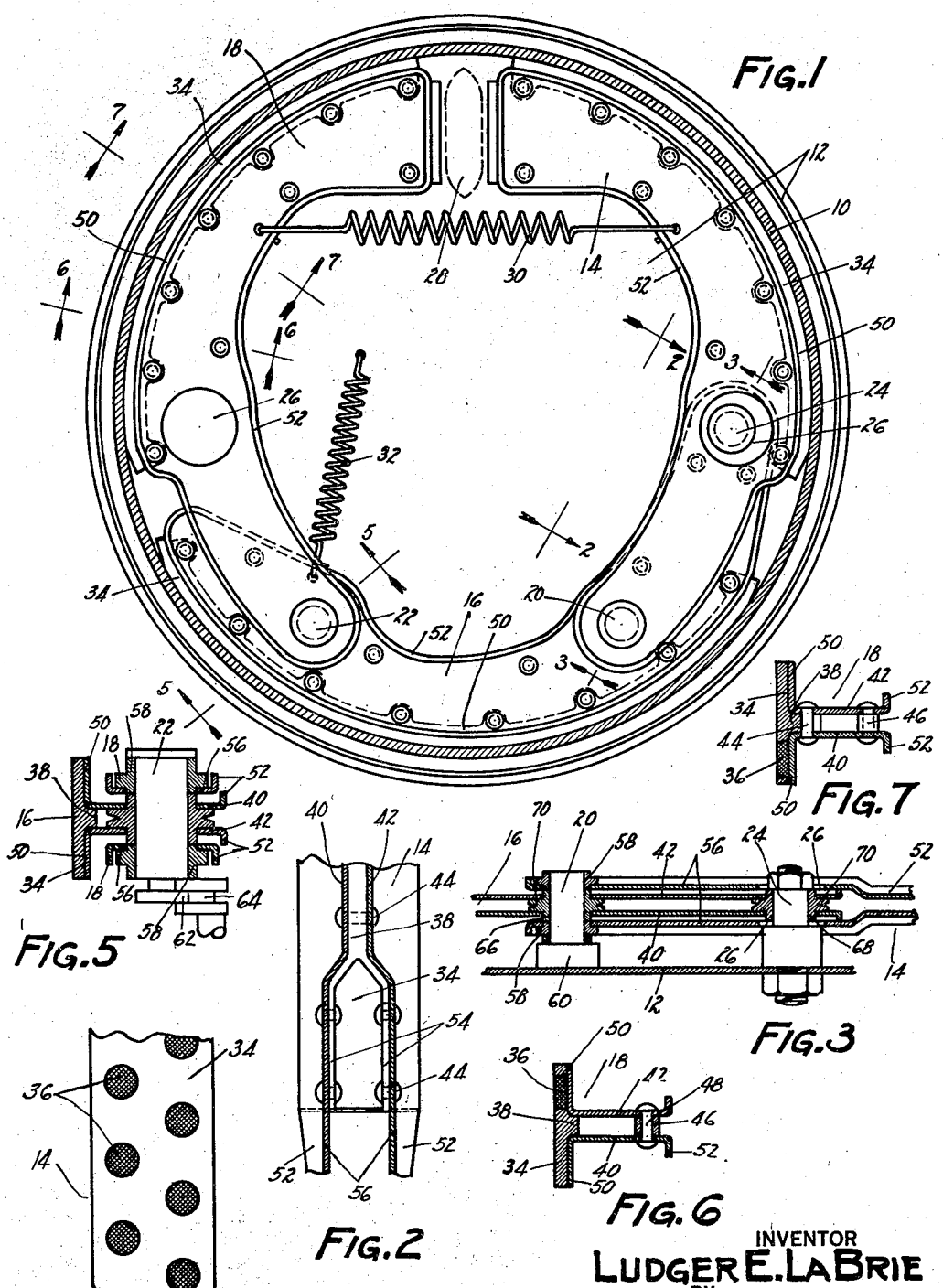
INVENTOR
LUDGER E. LA BRIE
BY
M. W. McConkey
ATTORNEY Patented Feb. 8, 1927.

1,616,583

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed September 20, 1926. Serial No. 136,445.

This invention relates to brakes and is illustrated as embodied in an internal expanding brake for an automobile. An object of the invention is to provide a strong and efficient shoe for use in such a brake.

One feature of novelty relates to providing novel stiffening means for the shoe, including two webs connected by spacing members so that they support each other and form a light but very strong composite stiffening web for the brake shoe. Preferably the stiffening webs are parts of stampings having cylindrical flanges secured to the inner face of a segmental cylindrical friction band. I prefer to form this band with a rib on its inner face, and to secure the stiffening webs at their outer edges in the angles between the rib and said inner face.

Another feature of the invention relates to forming a novel composite friction surface for the shoe, part of which is made up of the metal of the segmental band, and part of which is in the form of non-metallic parts fastened in openings in the band. I consider it best to provide means for retaining the non-metallic parts in the openings and which is continued to form the stiffening web of the shoe, for example by retaining the non-metallic parts in place by the above-described cylindrical flanges of the stampings which jointly make up the stiffening web.

The above and other objects and features of the invention, including various desirable details of construction, will be apparent from the following description of one illustrative embodiment shown in the accompanying drawing, in which:

Figure 1 is a vertical section through the brake just inside the head of the brake drum and showing the shoes in side elevation;

Figure 2 is an inside elevation of the end of one of the shoes looking in the direction of the arrows 2—2 in Figure 1;

Figure 3 is a partial section on the line 3—3 of Figure 1, showing the anchorage of the brake;

Figure 4 is a partial elevation of the friction face of the shoes;

Figure 5 is a partial section on the line 5—5 of Figure 1 and showing the pivotal connection between two of the shoes;

Figure 6 is a section through one of the shoes on the line 6—6 of Figure 1; and

Figure 7 is a section through the shoe on the line 7—7 of Figure 1.

The brake selected for illustration includes a rotatable drum 10 at the open side of which is arranged a suitable backing plate or other support 12 and within which are arranged three brake shoes 14, 16, and 18. Shoes 14 and 18 are connected to the shoe 16 by pivots 20 and 22, while shoe 16 is anchored on a pivot 24 passing through relatively large openings 26 in the arms forming the end of shoe 14. The brake is applied by means such as a double cam 28 against the resistance of a return spring 30, whereupon shoe 16 is forced toward the drum by shoe 18 against the resistance of an auxiliary return spring 32.

The present invention relates to the construction of the brake shoes. Preferably each shoe includes a segmental cylindrical band 34 having a suitable co-efficient of friction for direct engagement with brake drum 10, and which is formed with suitable openings for non-metallic parts 36. The openings for the non-metallic parts, shown in Figures 6 and 7, are preferably conical so that the parts will be retained in place when held by suitable retaining means on the inner face of the segmental band. Where the brake drum 10 is made of a high carbon steel, the segmental bands 34 might, for example, be made of bronze and the non-metallic parts 36 may be of cork or of the combination asbestos and copper wire material ordinarily used for brake linings.

I prefer to form on the inner face of each of the segmental bands 34 a rib 38 serving as a spacing member between two stiffening webs 40 and 42 shown secured to the rib by fastenings such as rivets 44. According to one feature of the invention, the stiffening webs 40 and 42 are connected by separate spacing members such as rings 46 held by rivets or other fastenings 48 which pass through them.

The non-metallic parts 36 are held in the openings in the band 34 by flanges 50 formed as integral extensions of the stampings forming the stiffening webs 40 and 42. I prefer to continue the flanges 50 entirely around each of the stampings in such a manner as to form a short reinforcing flange 52 along the inner edge of each of the stampings.

At the lower end of each of the shoes 14 and 18 the rib 38 is forked to form branches 54 serving to spread the stiffening flanges 40 and 42 apart so that they may be continued beyond the ends of the shoe to form spaced pivot arms 56 to be mounted on the pivot 20 or the pivot 22. As will be apparent from Figures 3 and 5, the spaced arms 56 of each of the shoes 14 and 18 are provided with bushings 58 forming bearings for the pivots. The pivot 20 is shown with an enlarged head 60 slidably engaging the backing plate 12 and positioning the pivoted end of the shoe 14, while the pivot 22 is shown grooved at its end to form a flange 62 engaging a grooved eccentric 64 which serves to hold the shoes laterally and which also serves as a stop against which the shoe 16 is urged by the spring 32.

The shoe 16 is provided with two bushings 66 and 68 forming bearings respectively for the pivot 20 and the anchor 24 and having projecting ribs 70 serving as spacing members for the two stiffening members of the shoe. If desired, the bushings 58, 66, and 68 may be welded to the stamping 40 and 42 for their respective shoes. In the arrangement illustrated the shoes 14 and 18 are of the same form and are interchangeable.

While one illustrative embodiment of the invention has been described in detail, it is not my intention to limit its scope to that particular embodiment or otherwise than by the terms of the appended claims.

I claim:

1. A brake shoe having a pair of spaced stiffening webs, in combination with separate spacing members secured between and connecting said webs.

2. A brake shoe having a pair of spaced stiffening webs, in combination with separate spacing members between said webs and fastenings passing through the webs and through the spacing members.

3. A brake shoe having, in combination, a segmental outer band, a pair of stiffening members spaced from each other and secured at their outer edges to the inner face of said band, and separate spacing members secured between and connecting said members some distance radially inward from the band.

4. A brake shoe having, in combination, a segmental outer band having a central rib on its inner face, a pair of stiffening members on opposite sides of said rib and secured at their outer edges to the inner face of said band and held spaced apart by said rib, and separate spacing members secured between and connecting said members some distance radially inward from the band.

5. A brake shoe having, in combination, a segmental outer band having a rib on its inner face, and a pair of stiffening members secured to the inner face of said band in the angles on opposite sides of said rib.

6. A brake shoe having, in combination, a segmental outer band having a rib on its inner face, and a pair of stiffening members secured to the inner face of said band in the angles on opposite sides of said rib and having outwardly-extending cylindrical flanges underlying the band on opposite sides of said rib.

7. A brake shoe having, in combination, a segmental cylindrical band having on its inner face a rib forked near one end of the shoe to form two branches, and a pair of stiffening members secured on opposite sides of said rib in the angles between the rib and band and continued beyond the two branches to form spaced pivot arms projecting from the end of the shoe.

8. A brake shoe having, in combination, a segmental metal friction member formed with openings, non-metal parts in said openings forming with the metal of said member a composite friction surface, and means retaining said parts in the openings and continued to form a stiffening web for the shoe.

9. A brake shoe having, in combination, a segmental metal friction member formed with openings, non-metal parts in said openings forming with the metal of said member a composite friction surface, and stampings retaining said parts in the openings and integrally continued as a stiffening web for the shoe.

10. A brake shoe having, in combination, a segmental metal friction member formed with openings, non-metal parts in said openings forming with the metal of said member a composite friction surface, and a pair of stampings, each having a cylindrical flange underlying a portion of said friction member and which jointly retain said non-metal parts in the openings, said stampings also having flanges jointly forming a stiffening web for the shoe.

In testimony whereof, I have hereunto signed my name.

LUDGER E. LA BRIE.